(12) United States Patent
Black

(10) Patent No.: US 11,204,340 B2
(45) Date of Patent: Dec. 21, 2021

(54) FORCED CONVECTION HEATER

(71) Applicant: Rosemount Inc., Shakopee, MN (US)

(72) Inventor: Steven S. Black, Houston, TX (US)

(73) Assignee: Rosemount Inc., Shakopee, MN (US)

( * ) Notice: Subject to any disclaimer, the term of this patent is extended or adjusted under 35 U.S.C. 154(b) by 154 days.

(21) Appl. No.: 16/138,269

(22) Filed: Sep. 21, 2018

(65) Prior Publication Data

US 2020/0096488 A1 Mar. 26, 2020

(51) Int. Cl.
*G01N 30/54* (2006.01)
*G01N 30/30* (2006.01)
G01N 30/02 (2006.01)

(52) U.S. Cl.
CPC ............. *G01N 30/54* (2013.01); *G01N 30/30* (2013.01); *G01N 2030/025* (2013.01); *G01N 2030/3084* (2013.01)

(58) Field of Classification Search
CPC ............................ G01N 130/54; G01N 30/30
See application file for complete search history.

(56) References Cited

U.S. PATENT DOCUMENTS

| 3,945,567 | A | * | 3/1976 | Rambach | F04F 5/466 239/14.2 |
| 6,157,778 | A | * | 12/2000 | Kadotani | F24H 1/142 392/483 |
| 6,851,467 | B1 | | 2/2005 | Bamford et al. | |
| 2003/0138244 | A1 | | 7/2003 | Long et al. | |
| 2004/0170413 | A1 | | 9/2004 | Atkins | |
| 2005/0258088 | A1 | * | 11/2005 | Botelho | G01N 30/30 210/198.2 |
| 2010/0226797 | A1 | * | 9/2010 | Fitton | F24F 1/01 417/313 |
| 2013/0052063 | A1 | | 2/2013 | Kirby et al. | |
| 2014/0158094 | A1 | | 6/2014 | Meiller | |
| 2015/0059450 | A1 | * | 3/2015 | Takahashi | G01N 30/30 73/61.53 |

FOREIGN PATENT DOCUMENTS

| JP | 61213441 A | 9/1986 |
| WO | 2007136702 A2 | 11/2007 |
| WO | 2017136702 A2 | 11/2007 |

OTHER PUBLICATIONS

International Search Report and Written Opinion for International Patent Application No. PCT/US2019/051476, dated Jan. 3, 2020, date of filing: Sep. 17, 2019, 12 pages.
First Examination Report for Indian Patent Application No. 202127004224. dated Jun. 24. 2021, 6 pages including English translation.

* cited by examiner

*Primary Examiner* — Paul M. West
*Assistant Examiner* — Mark A Shabman
(74) *Attorney, Agent, or Firm* — Christopher R. Christenson; Kelly, Holt & Christenson PLLC

(57) ABSTRACT

A heating assembly includes a base plate. The heating assembly also includes a heating component coupled to the base plate configured to heat an enclosure of the heating assembly and a fan assembly coupled to the base plate configured to circulate the heated air within the enclosure of the heating assembly.

19 Claims, 6 Drawing Sheets

FORCED CONVECTION HEATER

BACKGROUND

Various applications often necessitate a heating element to heat a sample or substance to a desired temperature. One example application is gas chromatography. Gas chromatography is the separation of a mixture of chemical compounds due to their migration rates through a chromatographic column. This separates the compounds based on differences in boiling point, polarity, or molecular size. The separated compounds then flow across a suitable detector, such as a thermal conductivity detector (TCD) that determines the concentration of each compound represented in the overall sample. Knowing the concentration of the individual compounds makes it possible to calculate certain physical properties such as BTU or specific gravity using industry-standard equations.

In operation, it may be necessary to position a gas chromatograph and/or other application within a hazardous environment having an explosive or combustible gas present. In this circumstance, the heating element may only operate under specific operating conditions to ensure that the heating element does not generate a source of ignition. For example, industry standard temperature classifications can specify a minimum ignition temperature threshold for a hazardous area. Additionally, temperature class ratings can specify a maximum surface temperature for an instrument in a particular environment.

However, in order to heat a sample or substance to a desired temperature, the heating element surface temperature may exceed the temperature classification. For example, a hazardous environment can be given a temperature classification rating of T6, indicating a minimum ignition temperature of 85° C. [185° F.] for the hazardous environment. However, a heating element within a gas chromatograph, or other device, may have to operate in excess of 85° C. to properly heat a mixture or substance to a desired temperature. Therefore, in order to comply with the industry standards, select devices may not be able to operate in hazardous environments.

SUMMARY

A heating assembly includes a base plate. The heating assembly also includes a heating component coupled to the base plate configured to heat an enclosure of the heating assembly and a fan assembly coupled to the base plate configured to circulate the heated air within the enclosure of the heating assembly.

DETAILED DESCRIPTION OF ILLUSTRATIVE EMBODIMENTS

In accordance with embodiments of the present invention, a heating assembly is provided that allows various devices and enclosures, such as an analytical oven of a gas chromatograph, to be used in hazardous environments. In one example, a heating assembly is provided that requires less supply air with a lower exposed surface temperature, compared to a standard heating element, to heat a sample or mixture to a desired temperature through forced convection. This will be discussed further with respect to FIGS. 3-6. Additionally, while the present description will proceed for a heating assembly to be used within a gas chromatograph, it is expressly contemplated that the present heating assembly may be used in a wide variety of different applications and devices utilized in hazardous environments.

Figure 1:
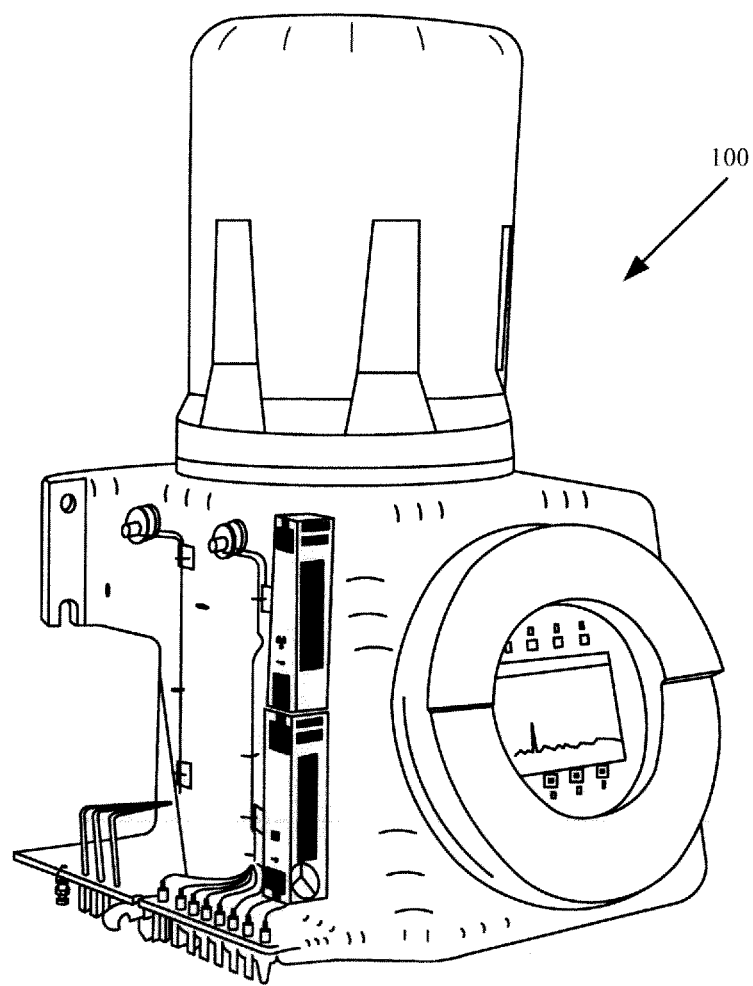
FIG. 1 is a diagrammatic view of a gas chromatograph with which embodiments of the present invention may be used.

FIG. 1 is a diagrammatic view of a gas chromatograph with which embodiments of the present invention may be used. While FIG. 1 illustrates a model 700XA gas chromatograph 100, available from Rosemount Inc., methods and embodiments provided herein may be utilized with other exemplary gas analyzers. This can include model 1500XA Process Gas Chromatographs and model 570 Natural Gas Chromatographs, both available from Rosemount Inc., among a variety of other types and models of gas chromatographs. Additionally, it is contemplated that a wide variety of other devices, beyond gas chromatographs, can be utilized with embodiments of the present invention.

Figure 2:
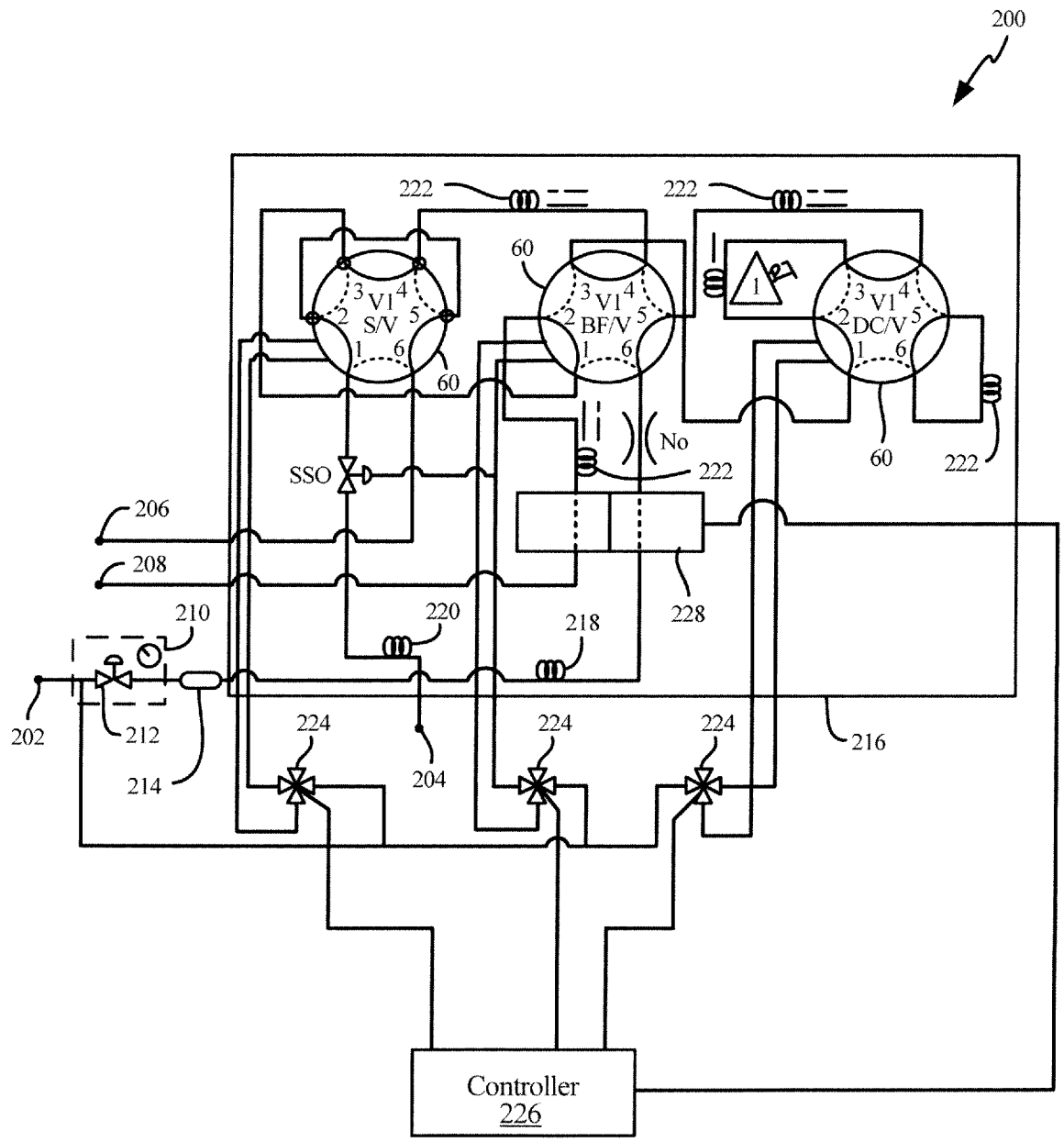
FIG. 2 is a diagrammatic system view of a gas chromatograph in accordance with an embodiment of the present invention.

FIG. 2 is a diagrammatic system view of a gas chromatograph in accordance with an embodiment of the present invention. While one example of a gas chromatograph 200 will now be provided, it is to be understood that gas chromatograph 200 can take a wide variety of other forms and configurations. For example, it is to be understood that gas chromatograph 200 may have other configurations for columns, valves, detectors, etc. However, in this example, gas chromatograph 200 illustratively includes a carrier gas inlet 202, a sample inlet 204, a sample vent outlet 206 and a measure vent outlet 208. In operation, carrier gas is provided to flow panel 210 where it passes through a regulator 212 and dryer 214 before entering analyzer oven 216 and passing through carrier gas pre-heater 218.

During measurement, sample gas enters chromatograph 200 via sample inlet 204 and passes through sample gas pre-heater 220 within analyzer oven 216. In accordance with embodiments of the present invention, heater(s) 218 and/or 220 can include heating assemblies that allow gas chromatograph 200 to be utilized in hazardous environments. This will be discussed further with respect to FIGS. 3-6. However, both sample gas (during measurement), or calibration gas (during calibration), and carrier gas eventually enter a plurality of pneumatically-controlled multiport selector valves 60 in order to selectively flow various volumes of a sample and/or carrier gas through various chromatographic columns 222 in accordance with known gas chromatography techniques. Each of pneumatically-controlled multiport selector valves 60 is fluidically coupled to a respective solenoid 224 that receives its control signal from controller 226.

Additionally, as shown in FIG. 2, each pneumatically-controlled multiport selector valve 60 has a pair of states. In the first state, the fluidic connections of each valve 60 are shown in solid lines. The fluidic connections of each valve 60 in the second state are shown in phantom. Controller 226 is also operably coupled to detector 228, which is, in one embodiment, a thermal conductivity detector disposed with analyzer oven 216. Thus, controller 226 is able to fully control flow through gas chromatograph 200 by virtue of controlling solenoids 224. Additionally, controller 226 is able to determine the response of detector 228 to gas flow therethrough. In this way, controller 226 is able to selectively introduce the sample into a chromatographic column for a selected amount of time, reverse the flow of gas through the chromatographic column; and direct the reverse flow through the detector to observe and/or record the detector response over time. This provides chromatographic analysis relative to the sample.

Figure 3:
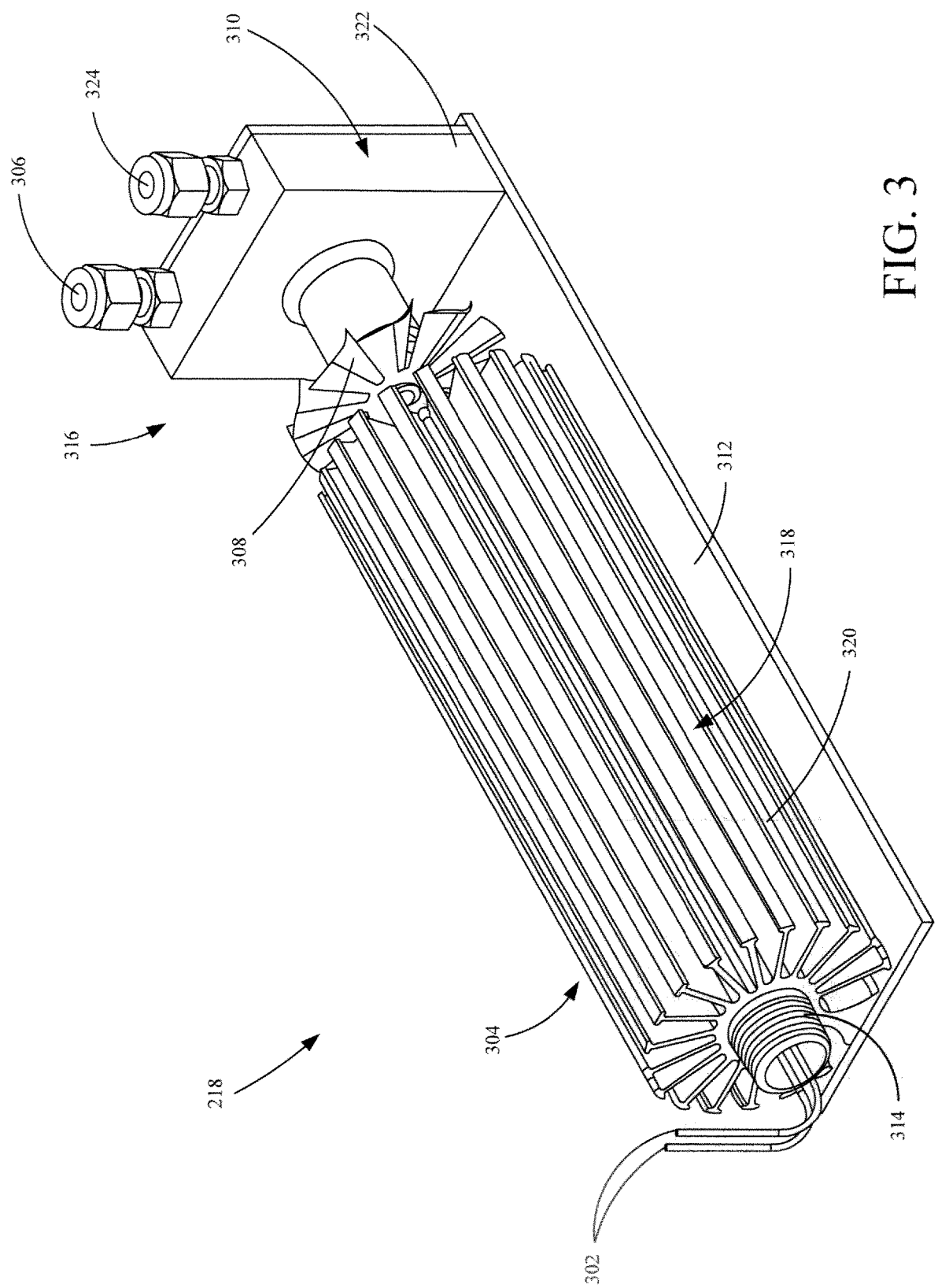
FIG. 3 is a diagrammatic view of a heating assembly in accordance with embodiments of the present invention.

FIG. 3 is a diagrammatic view of a heating assembly in accordance with embodiments of the present invention. Heating assembly 218 illustratively includes a heating component 304 and a fan assembly 316 attached to a base plate 312. Heating component 304 illustratively includes a heat sink 318 having a number of fins 320 radiating out from a housing portion (illustratively shown in FIG. 6) configured to house a cartridge heater. In operation, the cartridge heater, along with heat sink 318, can heat the surrounding air of heating assembly 218. While fins 320 of heat sink 318 illustratively fully extend along the housing portion, it is contemplated that, in other examples, fins 320 may only extend along a specific portion of the housing portion. In operation, the housing portion of heat sink 318 includes an inlet 314 for the cartridge heater that allows for leads 302 to extend through heat sink 318 to a heater power source. Leads 302 can be routed through a gland, conduit or other certified conveyance to the heater power source. Additionally, heat sink 318 can comprises any number of heat conducting materials such as aluminum, steel, or any other alloy.

Fan assembly 316 illustratively includes a fan 308 and a motor assembly 310. While motor assembly 310 will be described as a pneumatic motor, it is expressly contemplated that other types and configurations of motors can be used as well. For example, motor assembly 310 can include a rotary vane type and can be located external to an enclosure (e.g., analyzer oven 216 of gas chromatograph 200) of heating assembly 218. This can include hydraulic, electrical, mechanical or other types of pneumatic motors. However, in this example, motor assembly 310 includes a motor housing 322, an air inlet 324 and an exhaust port 306. In operation, compressed air is received, via air inlet 324, and drives a paddle wheel within motor housing 322 prior to exiting exhaust port 306. As will be discussed later with respect to FIG. 5, upon receiving compressed air, the paddle wheel drives a rotary shaft that extends through housing 322 and is attached to fan 308. Fan 308, in turn, can circulate the warmed air within an enclosure of heating assembly 218.

In this example, an enclosure of heating assembly 218 can be heated through forced convection in which the heated air adjacent heating component 304 is re-circulated within the enclosure through actuation of fan 308. This configuration allows for a reduction of necessary supply air required to heat the enclosure. Additionally, this also allows for a reduction in necessary power for heating assembly 218, while also allowing for a reduction in surface temperature for the heater cartridge within heat sink 318. Through forced convection, a gas chromatograph, or other device, with heating assembly 218 can heat a sample or mixture to a desired temperature while also complying with necessary industry standard temperature classifications for hazardous environments.

Figure 4:
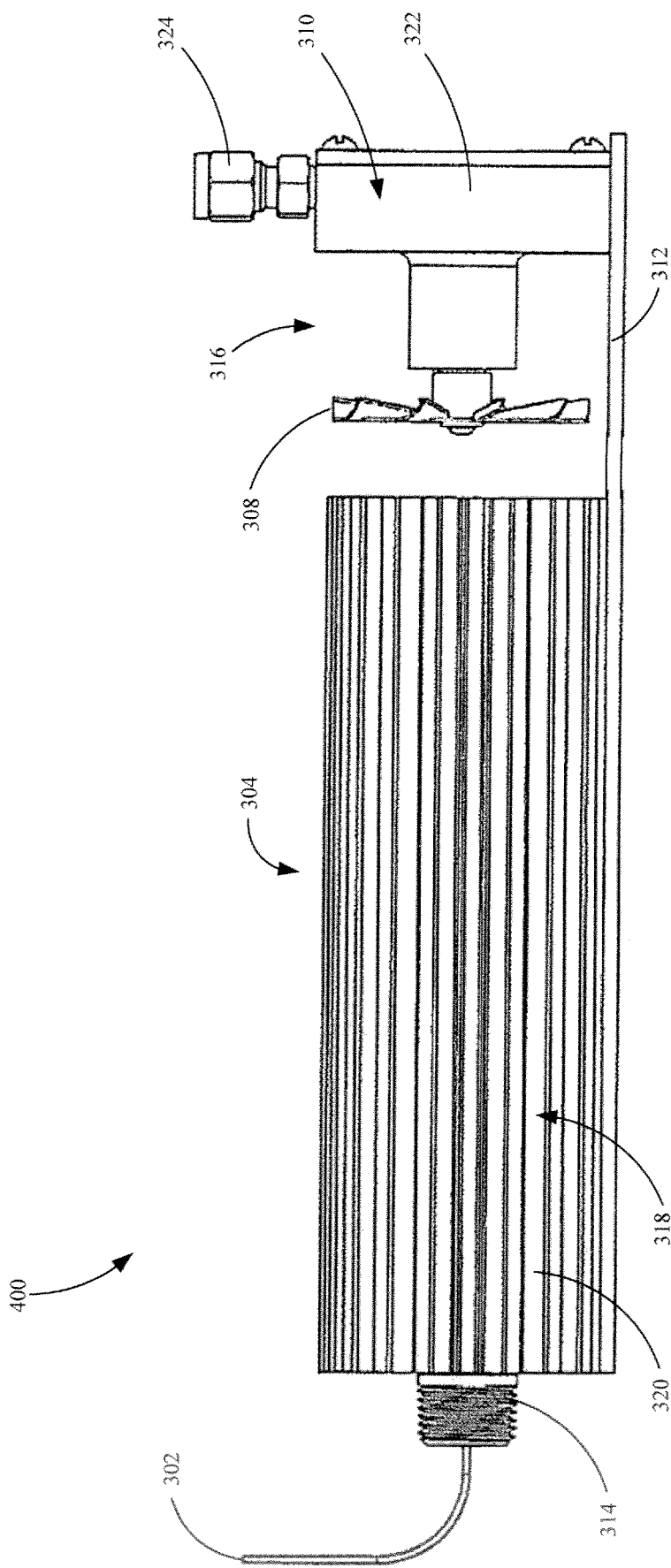
FIG. 4 is a diagrammatic side view of a heating assembly in accordance with embodiments of the present invention.

FIG. 4 is a diagrammatic side view of a heating assembly in accordance with embodiments of the present invention. Heating assembly 400 includes many of the same components as heating assembly 218, and, as such, is numbered similarly. Heating assembly 400 includes heating component 304 having a heating cartridge located within a housing portion of heat sink 318. Heat sink 318 illustratively includes radially-extending fins 320 and threaded inlet 314. In operation, one or more leads 302 coupled to the heating cartridge can traverse threaded inlet 314 and connect to a heater power source.

Heating assembly 400 also includes fan assembly 316 having fan 308 coupled to motor assembly 310. In accordance with different embodiments, fan 308 can take a variety of forms and configurations. For example, fan 308 can include a centrifugal type, and, additionally, does not have to align directly with heating component 304. For example, fan 308 can be positioned away from heat sink 318 and can still adequately recirculate the air in order to heat a sample or mixture within an enclosure of heating assembly 400. However, in the illustrated embodiment, fan assembly 316 includes motor assembly 310, with air inlet 324 and motor housing 322, aligned with heating component 304.

Figure 5:
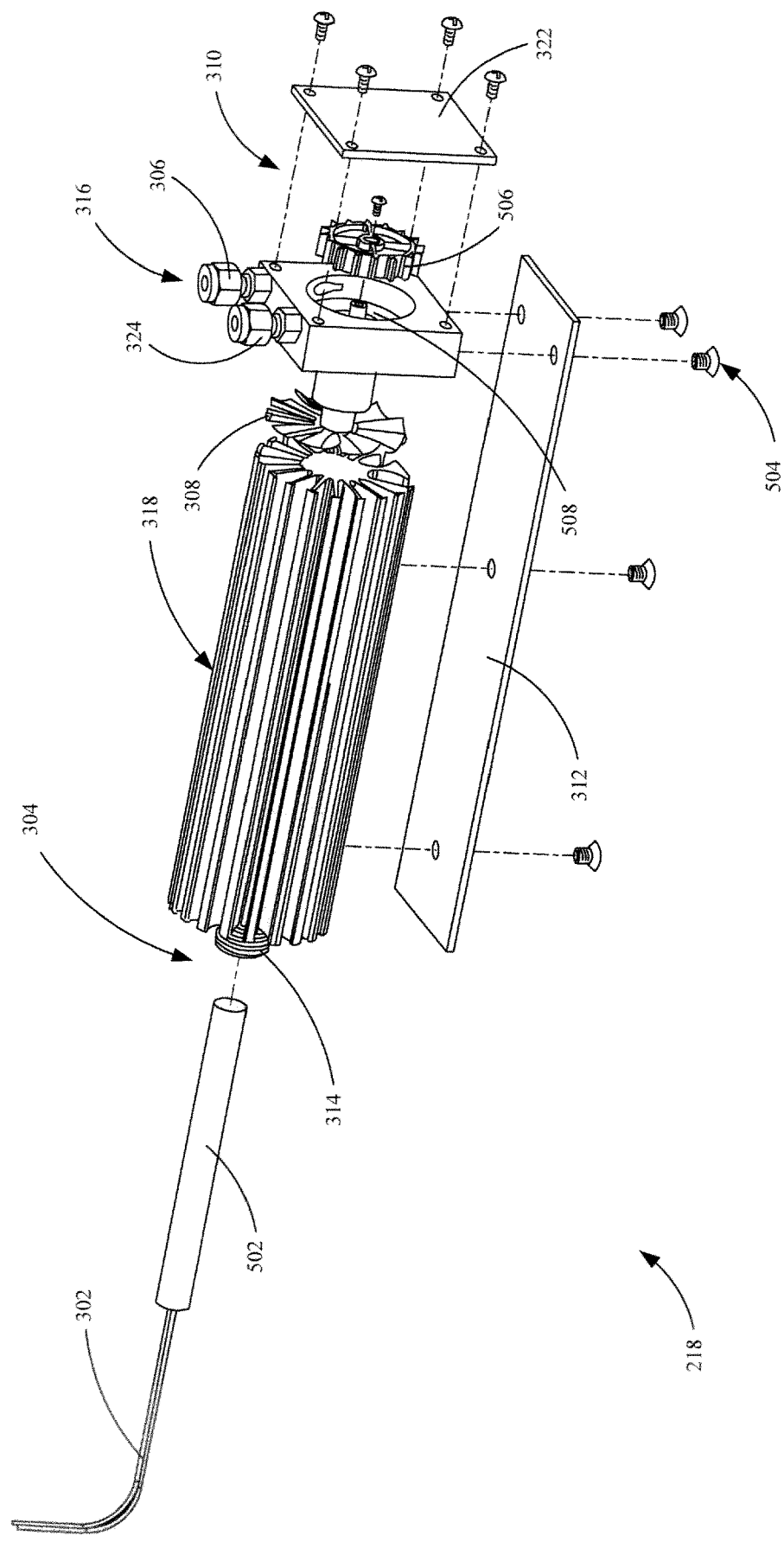
FIG. 5 is an exploded view of a heating assembly in accordance with embodiments of the present invention.

FIG. 5 is an exploded view of a heating assembly in accordance with embodiments of the present invention. Heating assembly 218 illustratively includes heating component 304, fan assembly 316 and base plate 312. As is illustratively shown, one or more fastening members 504 can be used to securely fasten heating component 304 and fan assembly 316 to base plate 312. Additionally, one or more fastening members 504 can be used to securely fasten other components of heating assembly 218 to each other. Heating component 304 includes a cartridge heater 502, coupled to a heater power source using leads 302, and a heat sink 318 that includes a housing portion and radially extending fins 320.

Fan assembly 316 illustratively includes fan 308 and motor assembly 310. Motor assembly 310 illustratively includes motor housing 322, air inlet 324, exhaust port 306, paddle wheel 506 and rotary shaft 508. In operation, compressed air can be received via air inlet 324 and used to drive paddle wheel 506 within motor housing 322 prior to being released via exhaust port 306. Paddle wheel 506, upon receiving the compressed air via air inlet 324, applies a rotary force to rotary shaft 508 which, in turn, drives fan 308. Fan 308, when actuated, circulates the heated air provided by heating component 304. This allows for a forced convection heater to heat an enclosure without necessitating a large quantity of supply air or an elevated surface temperature for cartridge heater 502.

Figure 6:
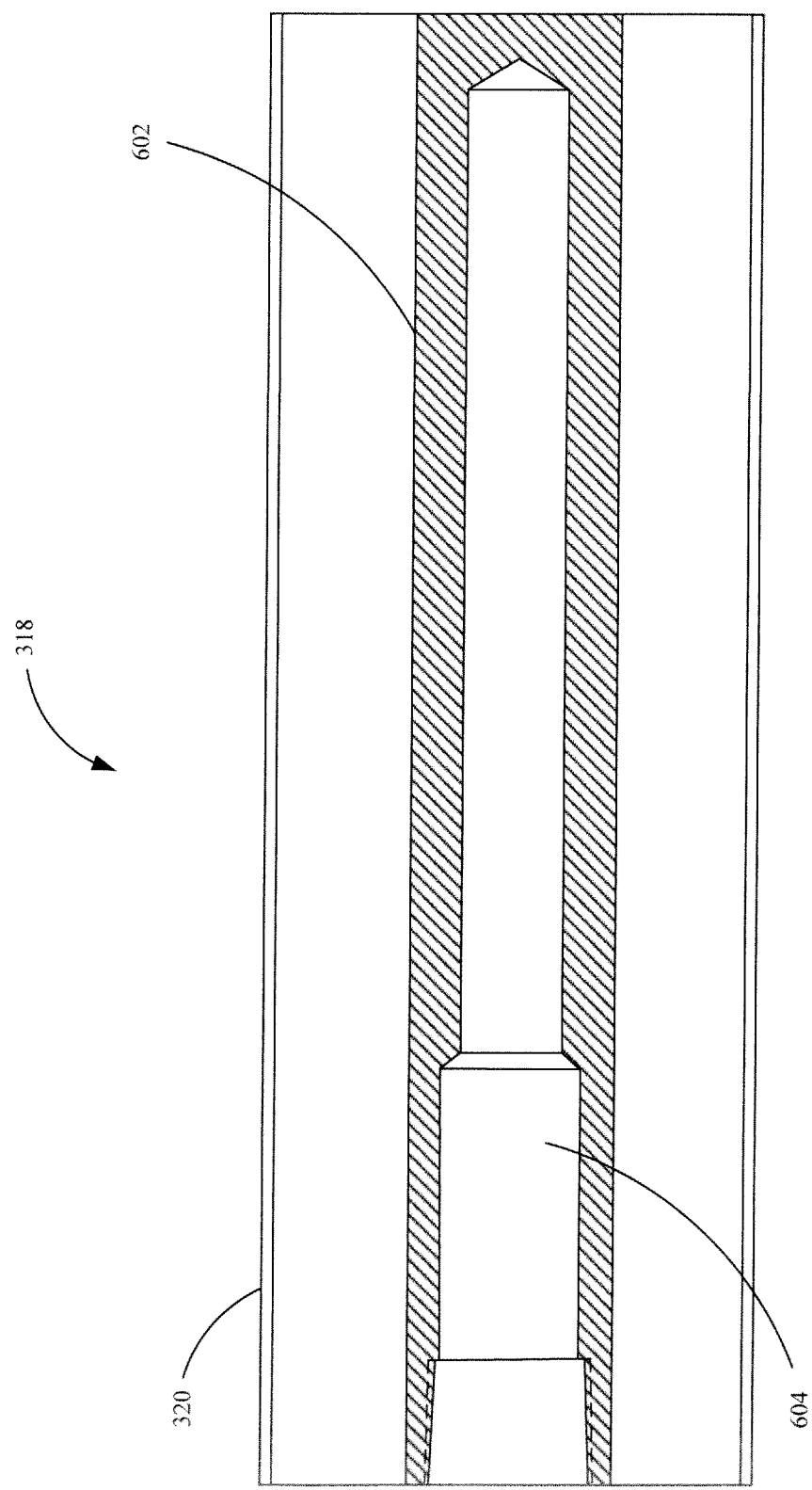
FIG. 6 is a cross sectional view of a heat sink of a heating assembly in accordance with embodiments of the present invention.

FIG. 6 is a cross sectional view of a heat sink of a heating assembly in accordance with embodiments of the present invention. Heat sink 318 illustratively includes a housing portion 602 and radially extending fins 320. Housing portion 602 is configured to house a heater cartridge (e.g., heater cartridge 502) within a bore 604 of housing portion 602. Bore 604 can take a wide variety of forms and configurations depending on a desired shape of a heater cartridge. In operation, a heater cartridge can be inserted into bore 604 and used to heat air adjacent to radially extending fins 320. Heated air may then be circulated around an enclosure using a fan assembly.

Although the present invention has been described with reference to preferred embodiments, workers skilled in the art will recognize that changes may be made in form and detail without departing from the spirit and scope of the invention.

What is claimed is:

1. A heating assembly, comprising:
   a base plate;
   a heating component directly coupled to the base plate and configured to be disposed in and heat an enclosure of the heating assembly, the heating component including:
   a heat sink comprising a housing portion and externally radiating fins; and
   wherein the housing portion is configured to receive a cartridge heater; and
   a fan assembly directly coupled to the base plate and configured to direct air through the heat sink.

2. The heating assembly of claim 1, wherein the housing portion of the heat sink comprises:
   an inlet configured to receive the heater cartridge, wherein, upon receiving the heater cartridge, leads coupled to the heater cartridge are configured to traverse the inlet.

3. The heating assembly of claim 1, wherein the heat sink comprises a heat conducting material.

4. The heating assembly of claim 3, wherein the heat conducting material comprises an aluminum alloy.

5. The heating assembly of claim 1, wherein the fan assembly comprises:
   a motor assembly comprising:
   a rotary element; and
   a motor coupled to the rotor element and configured to drive the rotary element; and
   a bladed fan coupled to the rotary element, the bladed fan configured to be driven by the rotary element to circulate heated air within the enclosure of the heating assembly.

6. The heating assembly of claim 5, wherein the motor comprises a pneumatic motor.

7. The heating assembly of claim 6, wherein the motor assembly further comprises:
   a motor housing that includes an air inlet and an exhaust port; and
   a paddle wheel coupled to the rotary element and configured to receive compressed air from the air inlet, wherein, upon receiving the compressed air, the paddle wheel rotates within the motor housing to drive the rotary element.

8. The heating assembly of claim 1, wherein the fan assembly and the heating component are coupled to the base plate such that the fan assembly is substantially aligned with the heating component.

9. The heating assembly of claim 1, wherein the fan assembly is located externally from the heating component.

10. The heating assembly of claim 1, wherein the enclosure comprises an analyzer oven of a process gas chromatograph.

11. The heating assembly of claim 10, wherein the process gas chromatograph is configured to be positioned within a hazardous environment.

12. A heating assembly, comprising:
    a base plate;
    a heating component directly coupled to the base plate and configured to heat an enclosure of the heating assembly, the heating component disposed in the enclosure and including:
    a heat sink comprising a housing portion and externally radiating fins; and
    a cartridge heater disposed within the housing portion and contacting the heat sink; and
    a fan assembly directly coupled to the base plate and configured to direct air through the heat sink.

13. The heating assembly of claim 12, wherein the fan assembly comprises:
    a motor assembly including:
    a rotary element; and
    a motor coupled to the rotary element and configured to drive the rotary element; and
    a bladed fan coupled to the rotary element, the bladed fan configured to be driven by the rotary element to project a flow of air forward from the fan assembly to the heat sink to circulate heated air within the enclosure of the heating assembly.

14. The heating assembly of claim 13, wherein the motor comprises a pneumatic motor and the motor assembly further comprises:
    a motor housing that includes an air inlet and an exhaust port; and
    a paddle wheel coupled to the rotary element and configured to receive compressed air from the air inlet, wherein, upon receiving the compressed air, the paddle wheel rotates within the motor housing to drive the rotary element.

15. The heating assembly of claim 14, wherein the enclosure of the heating assembly comprises an analyzer oven of a process gas chromatograph.

16. The heating assembly of claim 15, wherein the heating assembly complies with a hazardous environment temperature class rating.

17. The heating assembly of claim 12, wherein the housing portion includes a threaded inlet configured to receive the heater cartridge.

18. An analyzer assembly comprising:
    an enclosure; and
    a heating assembly disposed in the enclosure, the heating assembly comprising:
    a base plate;
    a heating component directly coupled to the base plate and configured to heat air within the enclosure, the heating component including:
    a heat sink comprising a housing portion and externally radiating tins; and
    a cartridge heater disposed within the housing portion; and
    a fan assembly directly coupled to the base plate, the fan assembly including:
    a motor assembly including:
    a rotary element; and
    a motor coupled to the rotary element and configured to drive the rotary element; and
    a bladed fan coupled to the rotary element, the bladed fan configured to be driven by the rotary element to project a flow of air forward from the fan assembly to the heat sink to circulate the heated air within the enclosure.

19. The measuring device assembly of claim 18, wherein the analyzer assembly comprises a process gas chromatograph and the enclosure comprises an analyzer oven of the process gas chromatograph.

* * * * *